March 6, 1962 R. P. DIMMER 3,024,324

NEGATIVE IMPEDANCE REPEATER

Filed April 27, 1960 2 Sheets-Sheet 1

INVENTOR.
Robert P. Dimmer
BY
C. A. Gullbrandsen
Atty.

March 6, 1962 R. P. DIMMER 3,024,324

NEGATIVE IMPEDANCE REPEATER

Filed April 27, 1960 2 Sheets-Sheet 2

INVENTOR.
Robert P. Dimmer
BY C. A. Gulbrandsen
Atty.

United States Patent Office 3,024,324

Patented Mar. 6, 1962

3,024,324

NEGATIVE IMPEDANCE REPEATER

Robert P. Dimmer, Lombard, Ill., assignor to Automatic Electric Laboratories, Inc., Northlake, Ill., a corporation of Delaware Filed Apr. 27, 1960, Ser. No. 25,139
8 Claims. (Cl. 179—170)

Figure 1:
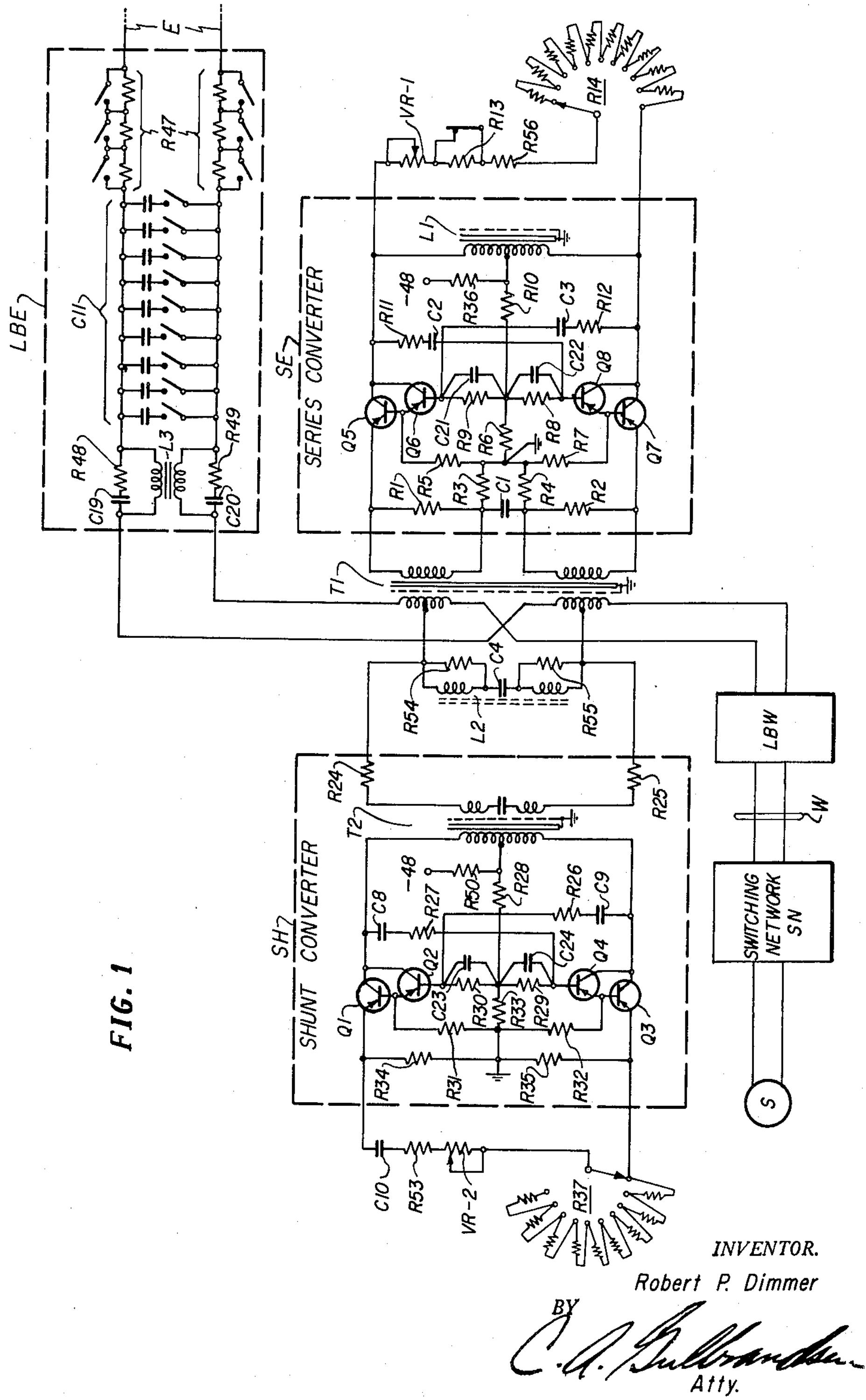

This invention relates to a negative impedance repeater. Its general object is to provide a stable repeater which is simple to install and to adjust its gain, and which produces very little signal reflection.

Negative impedance repeaters use a four-terminal active converter circuit with one pair of terminals coupled to the transmission line and the other pair of terminals coupled to a local network. The converter transforms the impedance of the local network into a negative impedance which is inserted in the line. To obtain a minimum impedance discontinuity, repeaters used with lines having loading coils comprise two converter circuits one connected in series with the line and the other connected in shunt with the line, each converter having its own local network. A line has an impedance characteristic which varies over the desired frequency range, and this must be compensated for or matched at the repeater. The repeater must also be provided with a gain adjustment. It has been the general practice to design the local network of each converter as a complicated network of impedance elements which may be connected in various combinations to match the impedance and adjust the gain. This method of adjustment is very time consuming, and if the gain of the repeater is to be changed the entire procedure must be repeated.

To overcome these disadvantages, a repeater has been proposed which separates the impedance matching and gain functions. Instead of matching the repeater to the line, the line is matched to the repeater. The proposed arrangement is particularly designed for use with a line having coil loading. The impedance transformation is made by a passive network called a line building-out network which is connected between the loaded line and the repeater. This network transforms the impedance presented by the loaded line to a constant resistive value. The local network is then reduced to an adjustable resistance which is relatively easy to change, to thereby adjust the gain.

The impedance network used between the line and the repeater may be essentially of a type known in the art for use at the end of loaded cables without repeaters. Such an impedance compensator alone will make a loaded cable look resistive up to near the cutoff frequency of the cable, but the impedance would drop above the cutoff frequency. This would cause the series converter of the repeater to oscillate, since it is theoretically short-circuit unstable. To overcome this the line build-out network may include circuit elements which resonate to maintain the impedance high at the upper frequencies. With a tuned impedance compensator of this type the impedance will remain essentially constant up to a frequency well above the desired range, and then it will rise abruptly. This rise in impedance will cause the shunt converter to oscillate because it is essentially open-circuit unstable.

It is a specific object of the invention to provide an arrangement in which the shunt converter will be stable at high frequencies, in a combination using a tuned impedance compensator line build-out network between a loaded line and a series-shunt repeater.

According to the invention, this specific object is achieved by connecting a series-resonant network across the terminals connecting the shunt converter to the line. The resonant frequency of this series resonant circuit occurs at approximately the frequency, above the desired transmission range, at which the line build-out network causes the impedance to rise.

Figure 2:
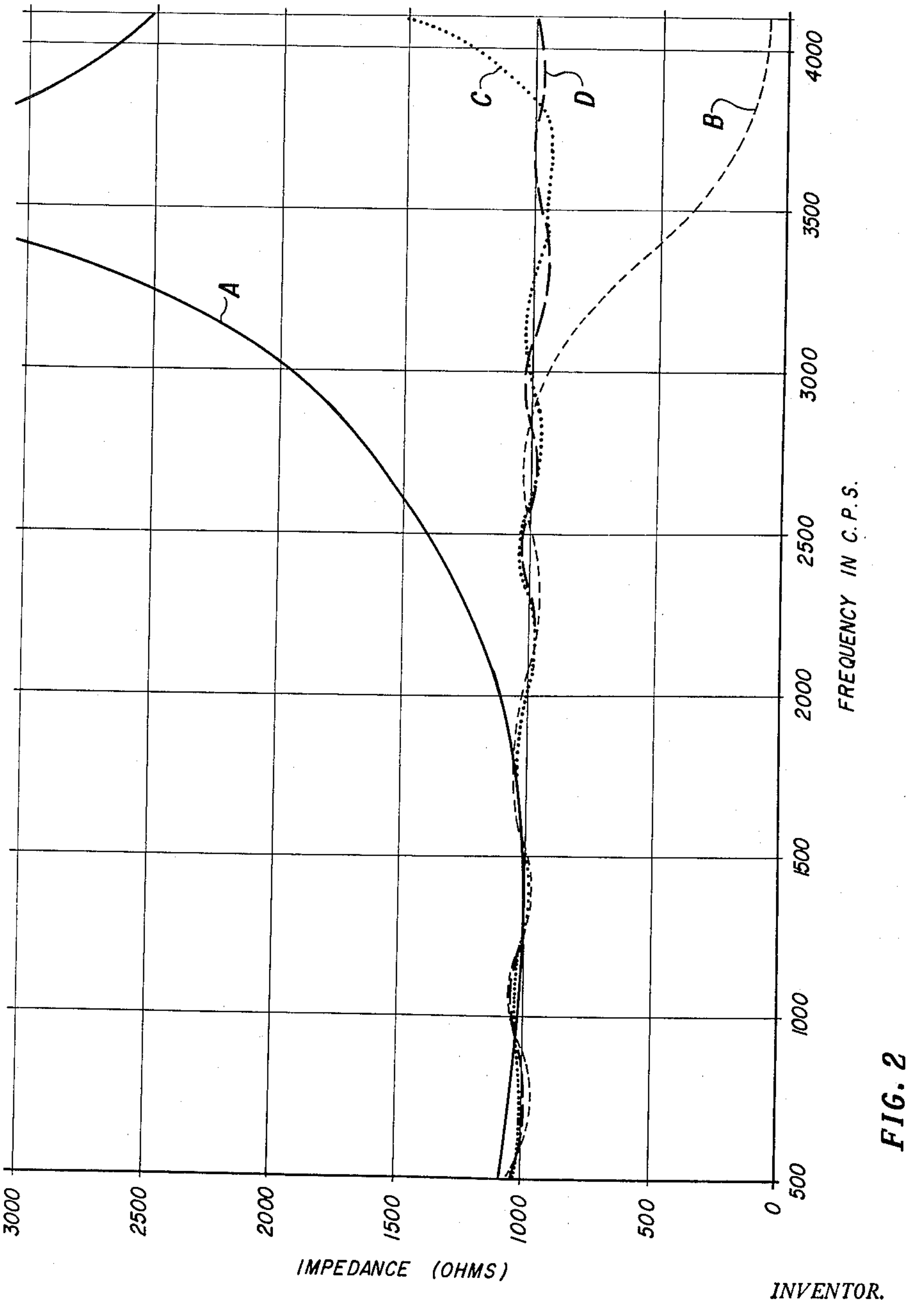

The above-mentioned objects and other features of this invention and manner of obtaining them will become more apparent, and the invention will be best understood, by reference to the following description of an embodiment of the invention taken in conjunction with the accompanying drawings comprising FIGS. 1 and 2 wherein:

FIG. 1 is a schematic diagram of a negative-impedance repeater and line build-out network combination according to the invention; and FIG. 2 is a graph for illustrating various impedance characteristics.

Within recent years negative-impedance repeaters have been widely used in telephone systems. These repeaters, when properly installed, have given creditable performance in improving transmission, on circuits (usually not exceeding 25 miles in length) connecting a subscriber to his local telephone office, or interconnecting a group of offices within an exchange area. Sometimes, however, present types of negative-impedance repeaters emphasize a problem called "talker echo."

When a subscriber makes a call his speech-energy travels over the telephone line to the called instrument. If the line and the instrument do not have a good impedance match, some of the speech-energy will be reflected back to the calling subscriber, and if an appreciable time is required for this travel to the distant instrument and back, the speech-energy will be received as an echo ("talker echo"). This noise creates an impression that the called subscriber is trying to interrupt.

Talker echo increases as return loss decreases (return loss is a measure of the extent to which the line impedance departs from that of the standard office impedance; it is measured in decibels). The objective is therefore to obtain the highest practical return loss, since more energy is then transmitted and less is reflected to the sender. If the impedance of the line were perfectly matched to that of the distant load, all the energy transmitted would be absorbed in the load equipment at the distant or receiving end of the circuit. However, such ideal conditions do not exist because the transmission line itself contains minor impedance irregularities and therefore does not match perfectly the sending and receiving devices at all frequencies.

Referring to FIGURE 1, the conductor pair E is a section of transmission line extending to a distant office. It may for example be a loaded cable pair with what is known as H88 loading, which has an 88 millihenry coil connected to the cable pair every 6,000 feet. Consider a 0.5 end section of such a cable pair. This pair has a resistance component which increases with frequency, but with a very small negative reactance component. Referring to the graphs in FIGURE 2, curve A shows the impedance of the line only. It is common practice to substantially improve the return loss of such a line by an impedance compensator to keep its impedance from changing significantly over the frequency range from 1,000 cycles up.

An impedance compensator widely used in telephone systems incorporates a conventional 44-millihenry load coil and build-out capacitance. The capacitance builds out the loading end section of a cable to approximately 0.8 section for which the resistance component of the impedance is substantially uniform over the frequency range up to a high fraction of the cutoff frequency, and the reactive component becomes increasingly negative with frequency. Since an inductance has a positive reactance to frequency, the addition of a coil of suitable magnitude at this point in the loading end section tends to cancel the negative reactance over the frequency range in question, resulting in an impedance substantially resistive and of fairly uniform value between 1,000 cycles and a frequency corresponding to about 0.85 cutoff. The resulting characteristic is illustrated by curve B in FIGURE 2.

The impedance on the side of the impedance compensator opposite to the transmission line remains primarily resistive over the voice-frequency band; consequently, it is possible to add, at this point, a negative-impedance repeater which uses only a resistance for its gain adjustment network. By making this resistance adjustable, a simple gain adjustment is obtained in the network. Since this type of gain adjustment does not involve phase angles, it matches closely the resistive line, and as a result, the overall frequency response of this combination becomes smoother than with former repeaters. Also, because of the use of the compensator, the return loss at the upper end of the frequency band (3,000 cycles), remains in the order about 20 db. when compared under similar conditions.

The basic impedance compensator will work satisfactorily with a combination series-shunt repeater when the circuit is in the idle condition. During the use condition the series converter of the repeater may oscillate. A series negative-impedance repeater is short-circuit unstable, and oscillation will occur as a result of the drop in impedance shown in curve B at high frequencies. To correct this unstable condition the compensator is resonated at 3,500 cycles.

In FIGURE 1 a building-out network LBE is shown which is designed for use with an H88 loaded cable pair E. The capacitance C11 comprises eight capacitors having respective values of 0.001, 0.002, 0.004, 0.005, 0.01, 0.02, 0.02 and 0.02 microfarad each. The inductor L3 comprises two inductively coupled windings serially connected in the respective conductors, and has a value of 44 millihenries. This inductor is resonated by capacitors C19 and C20 connected in shunt of the respective windings in series with the respective conductors. These capacitors may have values of 0.04 microfarad each. The resistors R48 and R49 in series with the respective capacitors, and having a value of 270 ohms each, broaden the resonant effect. Resistance R47 is also connected in series in the line. This resistance may comprise six resistors, three in series with each conductor having values of 14, 28, and 56 ohms respectively. Each resistor may be shorted out by a switch, so that the total resistance is adjusable up to a total value of 196 ohms.

The line build-out network LBE is designed to be used with different wire sizes and different end sections of H88 loaded cable. The value of capacitance C11 and resistance R47 is adjusted by selectively connecting in circuit the required capacitors and resistors to obtain optimum compensation. In FIGURE 2, curve C shows how with this compensator resonated at 3,500 cycles, the impedance is constant to nearly 4,000 cycles before a change occurs. Note that beyond this value the impedance rises.

FIGURE 1 shows a connection from a subscriber S over his subscriber loop, through a switching network SN, thence over a line section W, through a building-out network LBW, a connecting section of line to a building-out network LBE and thence to a line section E which extends to a distant office (not shown). Each conductor of the connecting section of the line includes a serially connected winding of transformer T1. A negative-impedance repeater coupled to the connecting section of the line at transformer T1 includes a series converter SE and a shunt converter SH. Each of these converters is an active four-terminal circuit having one pair of terminals which is open-circuit stable and one pair of terminals which is short-circuit stable. The circuitry of the converters may be of any conventional design. As shown each converter uses an arrangement in which two transistors are connected as a combined unit, as disclosed by S. Darlington in United States Patent 2,663,806. Two such combined units making a total of four transistors are used in each converter. This arrangement is used to improve stability and reduce temperature effects.

The series converter has its open-circuit stable terminals connected in series with the line by means of secondary windings of transformer T1. The local network which is connected to the short-circuit stable terminals comprises a variable resistor VR–1 having a value of 500 ohms, a resistor R13 having a value of 500 ohms which may be selectivey shorted out, a resistor R56 having a value of 3,300 ohms, and a resistance R14 comprising a plurality of fixed resistors connected to a rotary switch. The respective values of the resistors of R14 from top to bottom are two having a value of 820 ohms, three having values of 680 ohms, two having values of 560 ohms, and two having values of 470 ohms. The shunt converter SH has its short-circuit stable terminals connected in shunt of the line by connections to the center taps of the two windings of the transformer T1 which are in series with the line. The local network connected to the open-circuit stable terminals comprises a capacitor C10 having a value of 1.5 microfarads, a resistor R53 having a value of 1,000 ohms, a variable resistor VR–2 having a value of 500 ohms, and resistance R37 comprising a plurality of resistors connected to a rotary switch. The respective values of these resistors in R37 from top to bottom are two of 1,200 ohms, one of 270 ohms, one of 150 ohms, one of 91 ohms, one of 47 ohms, and three of 33 ohms. In the converters the capacitors C21, C22, C23, and C24 have values of 0.002 microfarad each. The resistors R8, R9, R29 and R30 have values of 2,200 ohms each. The capacitors C2, C3, C8, and C9 have values of 0.5 microfarad each; and the resistors R11, R12, R26, and R27 have values of 15,000 ohms each. The shunt converter SH uses a transformer T2 rather than series capacitors for coupling the transistor circuitry to the line connections.

The repeater may be located in the same office as the switching network SN, in which case the line section W is merely a short intra-office connection. The unit LBW is then merely a dummy unit with the conductors connected through from the connecting section of the line to the section W. Alternatively the repeater may be connected somewhere in the mid section of the transmission line between the two offices. In this case the line section W may be a loaded cable similar to section E, and the unit LBW is a line build-out network similar to the unit LBE.

Using tuned compensators in the line build-out networks as shown in unit LBE, the series converter of the repeater will be stable in the use condition but the shunt converter will oscillate in the idle condition, since this converter is open-circuit unstable and will oscillate when its termination impedance rises. According to the invention, this tendency to oscillate is corrected for by a series resonant circuit, peaked at 5,000 cycles, and bridged across the line terminals of the shunt converter, thereby keeping the line impedance substantially constant up to this range. The series resonant circuit comprises an inductor L2 having two inductively coupled windings with a capacitor C4 connected between them, and resistors R54 and R55 connected respectively across the two windings. This network has 44 millihenries of inductance, a value of 0.04 in the capacitor, and a value of 2,200 ohms for each of the resistors. In FIGURE 2, curve D shows the resulting impedance characteristic using the series resonant circuit across the shunt converter in combination with a tuned impedance compensator in the line build-out network, such as LBE connected between the repeater and the line section.

In the repeater arrangement shown in FIGURE 1, low frequency correction is afforded by adjustment of the ratio of series to shunt section gains. The capacitor C10 in the local network of the shunt converter SH is also instrumental in providing low frequency correction.

Stability at frequencies well beyond the frequency range in which amplification is desired is assured by the circuit constants within the converters.

While I have described above the principles of my invention in connection with specific apparatus, it is to be clearly understood that this description is made only by way of example and not as a limitation to the scope of my invention.

What is claimed is:

1. A combination including a negative-impedance type of repeater for reducing the loss in strength of signals transmitted within a given frequency range over an associated transmission line, said line comprising two line sections and a connecting section between them; said combination including a line build-out network coupled between one of said line sections and the connecting section, said network comprising impedance elements which compensate for the impedance-versus-frequency characteristic of said one line section so that at the connecting section the line impedance is substantially non-reactive and substantially constant within at least the middle and high frequency portions of said frequency range and rises at a frequency above said range, said repeater comprising two negative-impedance converters each having a pair of short-circuit stable terminals and a pair of open-circuit stable terminals, one converter having its open-circuit stable terminals connected in series with the line and its short-circuit stable terminals connected to a local network, and the other converter having its short-circuit stable terminals connected in shunt of the line and its open-circuit stable terminals connected to another local network, and characterized by a series-resonant network connected in shunt across the short-circuit stable terminals of said shunt-connected converter which is resonant at said frequency above said range to maintain the line impedance low at the shunt converter for frequencies above said range.

2. A combination as claimed in claim 1, wherein said series-resonant network comprises two inductively coupled windings, a capacitor connected in series between the windings, and two resistors connected respectively across said windings.

3. A combination as claimed in claim 1, wherein said transmission line comprises a loaded cable having loading coils connected across the cable at spaced intervals.

4. A combination as claimed in claim 3, wherein said line build-out network comprises shunt capacitance, two inductively coupled windings connected respectively in series with the line conductors, and capacitance in series with resistance effectively coupled in shunt of said inductive windings.

5. A combination as claimed in claim 1, wherein said repeater is coupled to said connecting section by a transformer having two primary windings connected respectively in series with the two line conductors, wherein the connection of the open-circuit stable terminals of said series connected repeater to said line section is by secondary winding means of said transformer, and wherein said connection of the short-circuit stable terminals of said shunt connected repeater to said line section is by connections to center taps of said primary windings.

6. A combination as claimed in claim 1, wherein said local network connected to the open-circuit stable terminals of said shunt connected network includes a capacitor in series with adjustable resistance means, and wherein said local network connected to the short-circuit stable terminals of said series connected converter comprises adjustable resistance means.

7. A combination as claimed in claim 1, wherein said two line sections are approximately equal lengths of loaded cable, and similar line build-out networks are connected between each line section and said connecting section.

8. A combination as claimed in claim 1, wherein the other of said line sections is an intra-office connection from said connecting section to a switching network.

References Cited in the file of this patent

UNITED STATES PATENTS

| | | |
|---|---|---|
| 1,836,810 | Mason | Dec. 15, 1931 |
| 2,356,867 | Meyers | Aug. 29, 1944 |
| 2,360,926 | Abraham | Oct. 24, 1944 |
| 2,582,498 | Merrill | Jan. 15, 1952 |
| 2,844,669 | Arndt | July 22, 1958 |